United States Patent
Dwelley

(10) Patent No.: US 9,705,325 B2
(45) Date of Patent: Jul. 11, 2017

(54) CONTROLLING SWITCHING CIRCUITS TO BALANCE POWER OR CURRENT DRAWN FROM MULTIPLE POWER SUPPLY INPUTS

(75) Inventor: David McLean Dwelley, Santa Barbara, CA (US)

(73) Assignee: LINEAR TECHNOLOGY CORPORATION, Milpitas, CA (US)

( * ) Notice: Subject to any disclaimer, the term of this patent is extended or adjusted under 35 U.S.C. 154(b) by 1284 days.

(21) Appl. No.: 11/444,405

(22) Filed: Jun. 1, 2006

(65) Prior Publication Data
US 2007/0281755 A1    Dec. 6, 2007

(51) Int. Cl.
*H02J 1/10* (2006.01)

(52) U.S. Cl.
CPC .................... *H02J 1/102* (2013.01)

(58) Field of Classification Search
CPC .................... H02J 1/10; H02J 1/102
USPC ........................ 307/34, 52, 53, 58
See application file for complete search history.

(56) References Cited

U.S. PATENT DOCUMENTS

| | | | | |
|---|---|---|---|---|
| 4,104,714 A | * | 8/1978 | Smith ................. | F23Q 3/004 363/124 |
| 4,272,806 A | * | 6/1981 | Metzger ............. | H02M 3/33507 315/241 P |
| 4,618,779 A | * | 10/1986 | Wiscombe ............ | G05F 1/59 307/60 |
| 4,866,295 A | * | 9/1989 | Leventis et al. ........ | 307/43 |
| 4,912,621 A | * | 3/1990 | Kobayashi et al. ....... | 363/71 |
| 4,972,292 A | * | 11/1990 | Petersen .............. | 361/56 |
| 5,144,222 A | * | 9/1992 | Herbert .............. | 323/271 |
| 5,477,132 A | * | 12/1995 | Canter ............... | B64G 1/428 320/101 |
| 5,552,643 A | | 9/1996 | Morgan et al. | |
| 5,659,208 A | * | 8/1997 | Kimble .............. | H02M 3/285 307/146 |
| 5,768,117 A | * | 6/1998 | Takahashi ............. | G05F 1/577 307/82 |
| 5,946,206 A | * | 8/1999 | Shimizu et al. ......... | 363/65 |
| 6,018,203 A | * | 1/2000 | David et al. ........... | 307/52 |
| 6,061,252 A | * | 5/2000 | Hosotani ............... | 363/16 |
| 6,121,693 A | * | 9/2000 | Rock ................. | H02J 1/10 307/18 |
| 6,144,115 A | * | 11/2000 | Massie et al. .......... | 307/80 |

(Continued)

FOREIGN PATENT DOCUMENTS

DE        196 24 793 A1    1/1998

OTHER PUBLICATIONS

International Search Report and Written Opinion of the International Searching Authority, issued in corresponding with International Application No. PCT/US2006/030828, dated on Aug. 16, 2007.

(Continued)

*Primary Examiner* — Adi Amrany
(74) *Attorney, Agent, or Firm* — McDermott Will & Emery LLP

(57) ABSTRACT

Novel techniques for balancing power or current drawn from multiple power supply inputs by controlling switching circuits associated with the respective power supply inputs. Each switching circuit may be controlled so as to limit current in its transformer or inductor in each switching cycle to a peak or average current value common to all switching circuits.

17 Claims, 6 Drawing Sheets

(56) References Cited

U.S. PATENT DOCUMENTS

| | | | | |
|---|---|---|---|---|
| 6,150,803 | A * | 11/2000 | Varga | H02M 3/1584 307/60 |
| 6,177,783 | B1 * | 1/2001 | Donohue | G05F 1/565 323/272 |
| 6,246,220 | B1 * | 6/2001 | Isham et al. | 323/224 |
| 6,301,133 | B1 * | 10/2001 | Cuadra | H02J 1/102 363/65 |
| 6,362,607 | B1 * | 3/2002 | Wickersham et al. | 323/272 |
| 6,424,129 | B1 * | 7/2002 | Lethellier | 323/272 |
| 6,433,527 | B1 * | 8/2002 | Izadinia et al. | 323/300 |
| 6,459,171 | B1 * | 10/2002 | Leifer | 307/52 |
| 6,462,520 | B1 * | 10/2002 | Mangtani | H02M 3/158 323/271 |
| 6,465,993 | B1 * | 10/2002 | Clarkin et al. | 323/272 |
| 6,556,461 | B1 * | 4/2003 | Khersonsky et al. | 363/41 |
| 6,665,404 | B2 * | 12/2003 | Cohen | 379/413 |
| RE38,487 | E * | 4/2004 | Isham et al. | 323/224 |
| 6,738,266 | B2 * | 5/2004 | Hosotani et al. | 363/16 |
| 6,747,442 | B2 * | 6/2004 | Olsen et al. | 323/283 |
| 6,801,030 | B2 * | 10/2004 | Tai et al. | 324/117 R |
| 6,809,678 | B2 * | 10/2004 | Vera et al. | 341/166 |
| 6,841,979 | B2 * | 1/2005 | Berson et al. | 323/282 |
| 6,894,464 | B2 * | 5/2005 | Zhang | 323/268 |
| 6,903,946 | B1 * | 6/2005 | Wu | 363/65 |
| 6,943,535 | B1 * | 9/2005 | Schiff | 323/246 |
| 6,960,905 | B2 * | 11/2005 | Chen et al. | 323/283 |
| 6,975,494 | B2 * | 12/2005 | Tang et al. | 361/64 |
| 7,005,835 | B2 * | 2/2006 | Brooks | H02M 3/1584 323/272 |
| 7,038,924 | B2 * | 5/2006 | Wu | 363/89 |
| 7,109,691 | B2 * | 9/2006 | Brooks et al. | 323/282 |
| 7,116,239 | B2 * | 10/2006 | Muratov et al. | 340/635 |
| 7,145,316 | B1 * | 12/2006 | Galinski, III | H02M 3/156 323/224 |
| 7,299,368 | B2 * | 11/2007 | Peker et al. | 713/300 |
| 7,301,313 | B1 * | 11/2007 | Hart | G06F 1/263 307/74 |
| 7,312,962 | B1 * | 12/2007 | Zansky | H02H 9/02 361/18 |
| 7,355,829 | B2 * | 4/2008 | Yamamura | H02J 1/10 361/91.1 |
| 7,397,230 | B2 * | 7/2008 | Tabaian et al. | 323/284 |
| 7,405,545 | B2 * | 7/2008 | Yang | 323/269 |
| 7,446,431 | B2 * | 11/2008 | Chiu | H02M 3/1584 307/52 |
| 7,466,116 | B2 * | 12/2008 | Sato et al. | 323/285 |
| 7,565,559 | B2 * | 7/2009 | Chapuis | 713/300 |
| 7,596,007 | B2 * | 9/2009 | Phadke et al. | 363/71 |
| 7,863,772 | B2 * | 1/2011 | Dwelley et al. | 307/19 |
| 2001/0038277 | A1 * | 11/2001 | Burstein et al. | 323/272 |
| 2003/0142513 | A1 * | 7/2003 | Vinciarelli | H02J 1/102 363/17 |
| 2003/0222504 | A1 | 12/2003 | Priest | |
| 2004/0046535 | A1 * | 3/2004 | Duffy et al. | 323/283 |
| 2004/0201933 | A1 | 10/2004 | Blanc | |
| 2005/0099827 | A1 * | 5/2005 | Sase | H02M 3/33592 363/16 |
| 2005/0194839 | A1 * | 9/2005 | Amerom et al. | 307/82 |
| 2005/0206358 | A1 * | 9/2005 | Van Der Horn | H02M 3/156 323/282 |
| 2005/0213352 | A1 * | 9/2005 | Lys | F21S 48/325 363/17 |
| 2005/0286277 | A1 * | 12/2005 | Krein | H02J 1/102 363/65 |
| 2007/0008744 | A1 * | 1/2007 | Heo | H02M 3/3376 363/17 |
| 2007/0041221 | A1 * | 2/2007 | Phadke | H02M 3/33576 363/16 |
| 2007/0207734 | A1 * | 9/2007 | Briere | 455/41.2 |
| 2009/0140706 | A1 * | 6/2009 | Taufik et al. | 323/272 |

OTHER PUBLICATIONS

Siri K. et al., "Current Distribution for Parallel-connected DC Power Sources Without Remote Sensing", 16th Annual Telecommunications Energy Conference, Oct. 30, 1994, pp. 196-203, Vancouver B.C., Canada.

* cited by examiner

CONTROLLING SWITCHING CIRCUITS TO BALANCE POWER OR CURRENT DRAWN FROM MULTIPLE POWER SUPPLY INPUTS

TECHNICAL FIELD

This disclosure relates to power supply systems, and more particularly, to circuitry and methodology for controlling switching regulators to balance power or current drawn from multiple power supply inputs.

BACKGROUND ART

Devices having multiple power supply inputs may balance current drawn from these inputs to draw maximum power from all supplies without overloading individual inputs. Typically, the current balancing is performed using either resistive ballasting or active balancing.

Resistive ballasting involves adding series resistance to each input. As the current draw on one input increases, the voltage drop across the resistance on that input increases proportionally, decreasing the voltage available to the device from that input and causing it to draw more current from the other inputs. However, resistive ballasting tends to waste power in the resistors, especially when two input voltages are significantly different from each other.

Active balancing typically involves inserting a resistor in series with each input and measuring the current in each input across this resistor. The resulting signals are used to actively adjust individual regulators attached to each input to increase or decrease their percentage of the total current draw. This technique typically improves efficiency over the resistor ballasting scheme, but it is complicated and typically involves a large amount of specialized circuitry.

Therefore, it would be desirable to develop simple and efficient techniques for balancing power or current draw from multiple power supply inputs.

SUMMARY OF THE DISCLOSURE

The present disclosure offers novel techniques for balancing power or current drawn from multiple power supply inputs.

In accordance with one aspect of the disclosure, a power supply circuit having multiple power supply inputs includes multiple switching circuits coupled to the respective power supply inputs, at least one inductive component associated with the switching circuits, and control circuitry for controlling the switching circuits so as to limit current in the inductive component in each switching cycle to a current value common to all switching circuits.

In particular, the control circuitry may control the switching circuits so as to limit the current in the associated inductive component in each switching cycle to a common peak current value.

Alternatively, the control circuitry may control the switching circuits so as to limit the current in the associated inductive component in each switching cycle to a common average current value.

As a result, the control circuitry may balance power or current drawn from each of the power supply inputs.

The inductive component may include a transformer. For example, a separate transformer may be provided for each of the switching circuits. Alternatively, a common transformer may be shared by the switching circuits.

In accordance with another aspect of the disclosure, the inductive component may include an inductor, which may be associated with each of the switching circuits.

Each of the switching circuits may comprise a switching regulator. For example, the switching regulators may have a flyback configuration. Alternatively, the switching regulators may have a buck configuration, a boost configuration, or a buck/boost configuration. Also, the switching regulators may be implemented as forward converters.

In accordance with an embodiment of the disclosure, the control circuitry may include comparator circuitry for comparing a value corresponding to current in each of the switching circuits with a preset threshold value common to all switching circuits. The preset threshold value may be selected to limit current in the inductive component associated with the switching circuits.

Further, the control circuitry may include logic circuitry responsive to an output of the comparator circuitry and controlled by a clock signal common to all switching circuits for producing multiple control signals for controlling the respective switching circuits.

The comparator circuitry may include multiple comparators corresponding to the respective switching circuits, and the logic circuitry may include multiple logic circuits responsive to the respective comparators for controlling switching of the respective switching circuits.

Alternatively, the comparator circuitry may include a single comparator for comparing a current value common to all of the switching circuits with the threshold value, and a logic circuit responsive to an output of the comparator for producing multiple control signals for controlling switching of the respective switching circuits.

The logic circuitry may produce interleaving control signals so as to turn on only one of the switching circuits at a time.

To limit the current in the transformer in each switching cycle to a common average current value, the control circuitry may further include an integrator responsive to current in each of the switching circuits for providing the comparator circuitry with a current value integrated over a switching cycle.

In accordance with another embodiment of the present disclosure, the control circuitry for controlling switching regulators operating in a buck mode may include differential-to-single-ended converters for converting differential signals sensed at the power supply inputs to single-ended signals. Comparators may compare the single-ended signals with a common threshold value selected to limit current in the inductive component. In response to outputs of the comparators, pulse-width-modulation circuits may control switching of the switching regulators.

In accordance with a further embodiment of the disclosure, the control circuitry for controlling the switching regulators operating in a boost mode may include comparators for comparing signals sensed at the power supply inputs with a common threshold value selected to limit current in the inductive component. Pulse-width-modulation circuits responsive to outputs of the comparators may control switching of the switching regulators.

The circuit of the present disclosure may support various arrangements of power supply inputs, including power supply inputs that share a common ground, power supply inputs that share a common power supply and use separate grounds, or power supply inputs electrically isolated from each other.

The switching circuits may be connected to provide a single power supply output or multiple power supply outputs.

In accordance with a further aspect of the disclosure, the power supply circuit of the present disclosure may be incorporated into a system for supplying power to a powered device over a communication link, such as Ethernet cabling, having a first wire set and a second wire set. The power supply circuit may balance signals supplied to the powered device from the first and second wire sets.

In accordance with one method of the present disclosure, the following steps are carried out to balance current drawn from multiple power supply inputs:

converting signals supplied from the power supply inputs using respective switching circuits associated with at least one inductive component, and comparing signal values in the switching circuits with a preset threshold value common to all of the switching circuits to limit current in the inductive component in each switching cycle to a common current value.

Each of the switching circuits may be turned off when a respective signal value reaches the preset threshold value.

Additional advantages and aspects of the disclosure will become readily apparent to those skilled in the art from the following detailed description, wherein embodiments of the present disclosure are shown and described, simply by way of illustration of the best mode contemplated for practicing the present disclosure. As will be described, the disclosure is capable of other and different embodiments, and its several details are susceptible of modification in various obvious respects, all without departing from the spirit of the disclosure. Accordingly, the drawings and description are to be regarded as illustrative in nature, and not as limitative.

BRIEF DESCRIPTION OF THE DRAWINGS

The following detailed description of the embodiments of the present disclosure can best be understood when read in conjunction with the following drawings, in which the features are not necessarily drawn to scale but rather are drawn as to best illustrate the pertinent features, wherein.

DETAILED DISCLOSURE OF THE EMBODIMENTS

Although the present disclosure uses the example of balancing current or power in a Power over Ethernet (PoE) environment, one skilled in the art would realize that the disclosed circuitries and methodologies are applicable to any system that draws power from two or more inputs.

Over the years, Ethernet has become the most commonly used method for local area networking. The IEEE 802.3 group, the originator of the Ethernet standard, has developed an extension to the standard, known as IEEE 802.3af, that defines supplying power over Ethernet cabling. The IEEE 802.3af standard describes a Power over Ethernet (PoE) system that involves delivering power over unshielded twisted-pair wiring from a Power Sourcing Equipment (PSE) to a Powered Device (PD) located at opposite sides of a link. Traditionally, network devices such as IP phones, wireless LAN access points, personal computers and Web cameras have required two connections: one to a LAN and another to a power supply system. The PoE system eliminates the need for additional outlets and wiring to supply power to network devices. Instead, power is supplied over Ethernet cabling used for data transmission.

Figure 1:
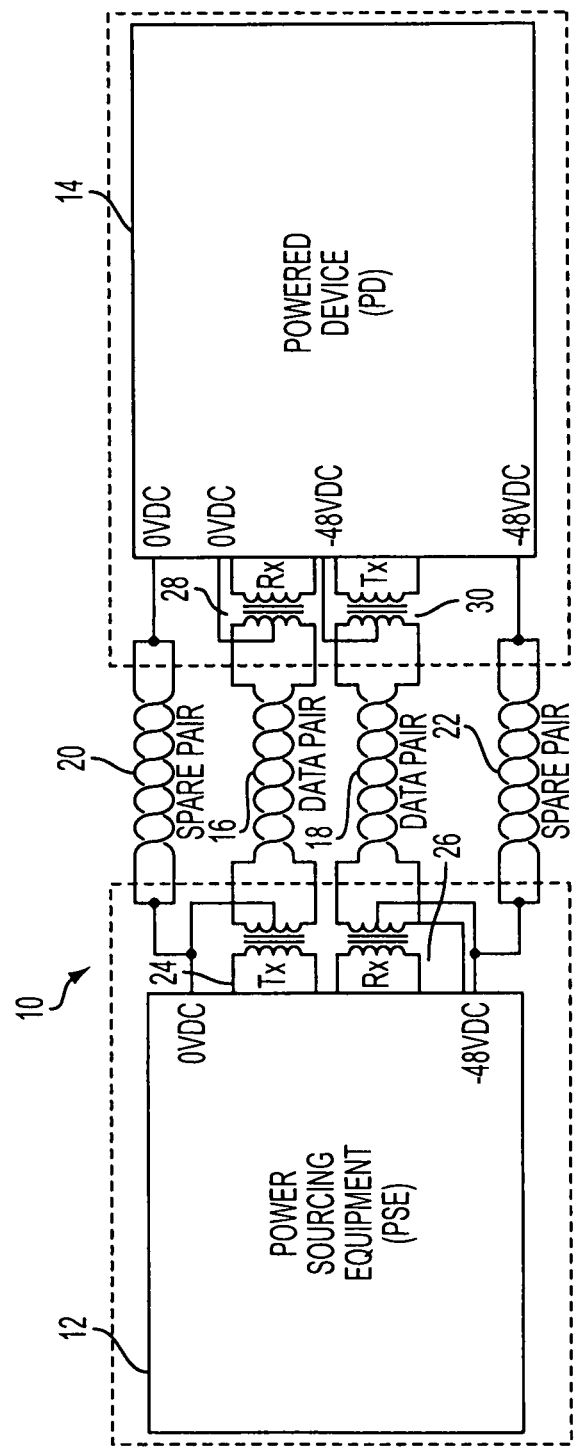
FIG. 1 is a diagram illustrating a Power over Ethernet system having two wire sets for supplying power to a powered device.

FIG. 1 shows a simplified block-diagram illustrating a Power over Ethernet (PoE) system 10 including a PSE 12 that may provide power to a PD 14 over an Ethernet link segment having four twisted pairs of conductors—data pairs 16 and 18 and spare pairs 20 and 22. The data pairs 16 and 18 are respectively provided between data transformers 24 and 26 on the PSE side and data transformers 28 and 30 on the PD side. These data transformers may be used for connecting physical layer (PHY) devices involved in the Ethernet data transmission. The PSE 12 may have multiple ports connectable to multiple PDs 14 via respective Ethernet links The PSE 12 may interact with each PD 14 in accordance with the IEEE 802.3af standard. In particular, the PSE 12 and the PD 14 participate in the PD detection procedure, during which the PSE 12 probes a link to detect the PD. If a PD is detected, the PSE 12 checks the PD detection signature to determine whether it is valid or non-valid. The valid and non-valid detection signatures are defined in the IEEE 802.3af standard. While the valid PD detection signature indicates that the PD is in a state where it will accept power, the non-valid PD detection signature indicates that the PD will not accept power.

If the signature is valid, the PD has an option of presenting a classification signature to the PSE to indicate how much power it will draw when powered up. For example, a PD may be classified as class 0 to class 4. Based on the determined class of the PD, the PSE applies the required power to the PD.

A 802.3af standard PoE system supports transferring power only over two pairs of conductors, either over the data pairs 16 and 18 or over the spare pairs 20 and 22. However, due to the resistance and associated heating of the Ethernet cabling system, only a limited amount of power may be delivered over 2 pairs of conductors.

To provide more power to a PD, it would be desirable to use more wires in the Ethernet cable. In particular, power transferred from the PSE 12 to the PD 14 may be applied to both data and spare pairs of conductors of the same Ethernet link segment simultaneously to reduce the cable system resistance. As a result, the PSE 12 may be enabled to support high-power PDs requiring more power than available in accordance with the 802.3af standard. For example, a 48V DC voltage may be simultaneously applied from the PSE 12 to the data pairs 16 and 18, and the spare pairs 20 and 22 provided within an Ethernet link segment between the PSE 12 and the PD 14.

Figure 2:
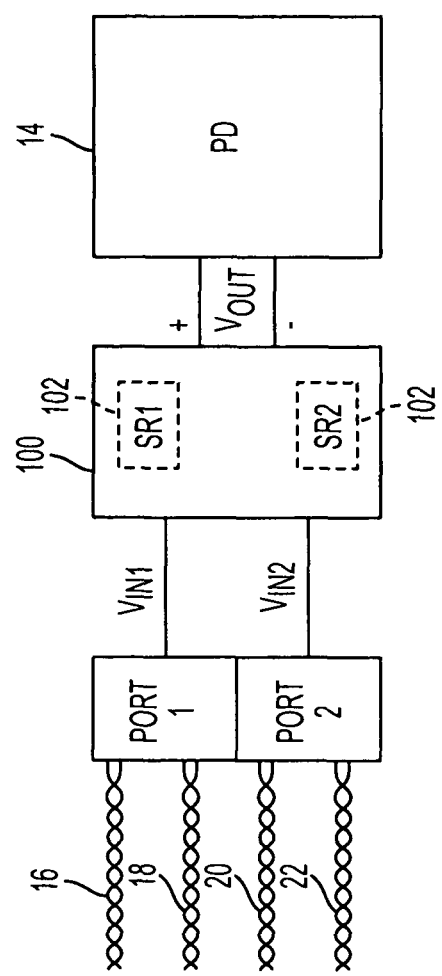
FIG. 2 is a diagram illustrating circuitry of the present disclosure for balancing power or current supplied from the two wire sets to the powered device.

FIG. 2 schematically illustrates the PD 14 that receives power from input port 1 supplied via the data pairs 16 and 18, and input port 2 supplied via the spare pairs 20 and 22. Balancing circuitry 100 is connected between the input ports 1 and 2, and the PD 14 to balance power or current supplied from the input ports. For example, the balancing circuitry 100 may cause equal amounts of power or current to be drawn from the input ports 1 and 2 to maximize the power which the PD 14 may draw from the PSE 12 without overloading either input. The balancing circuitry 100 may be arranged either outside or inside the PD 14. Although in the example illustrated in FIG. 2, the balancing circuitry 100 has two power supply inputs and a single power supply output, one skilled in the art will realize from the disclosure presented below that the balancing circuitry of the present disclosure may have more than two inputs and multiple outputs.

The balancing circuitry 100 includes a switching regulator (SR) 102 for each power supply input, and associated circuitry operating together with the switching regulators 102 to balance power or circuit drawn from the power supply inputs. For example, FIG. 2 shows switching regulators SR1 and SR2 respectively supporting input port 1 and input port 2. Outputs of the switching regulators 102 may be connected to produce one or more output DC voltages Vout in response to input DC voltages $V_{IN1}$ and $V_{IN2}$ applied to the respective regulators.

Each of the switching regulators 102 may have a flyback configuration that enables generation of an output DC voltage less than or greater than an input DC voltage. As well known to one skilled in the art of switching regulators, a flyback switching regulator may provide a single output DC voltage, as well as multiple output DC voltages. Moreover, the switching regulators 102 may operate in a continuous mode as well as in a discontinuous mode.

Alternatively, each switching regulator 102 may be arranged in a buck configuration to reduce an input DC voltage to a lower output DC voltage, in a boost configuration to provide an output DC voltage higher than an input DC voltage, or in a buck/boost configuration to generate an output DC voltage opposite in polarity with respect to an input DC voltage. Further, each of the switching regulators 102 may be implemented as a forward DC-DC converter that directly transfers energy from the power supply input to the load during the on-time of the power switch.

Although the balancing circuitry 100 in FIG. 2 illustrates the example of balancing current or power drawn from twisted-wire pairs of the Ethernet cabling, the balancing circuitry of the present disclosure may be implemented for supporting any system that draws power or current from two or more power supply inputs. For example, the balancing circuitry of the present disclosure may support power supply inputs that share a common ground, power supply inputs that share a common power supply and use separate grounds, and power supply inputs electrically isolated from each other.

Moreover, the balancing circuitry of the present disclosure may be configured to draw equal current or power from each of the power supply inputs. Alternatively, any desired ratio may be set for amounts of current or power drawn from different power supply inputs.

FIGS. 3A-3G illustrate a balancing technique of the present disclosure, which involves controlling the switching regulators so as to limit current in the associated transformers or inductors in each switching cycle to a common peak current value or a common average current value. This technique enables the balancing circuitry of the present disclosure to draw equal power or current from each of the power supply inputs.

Figure 3A:
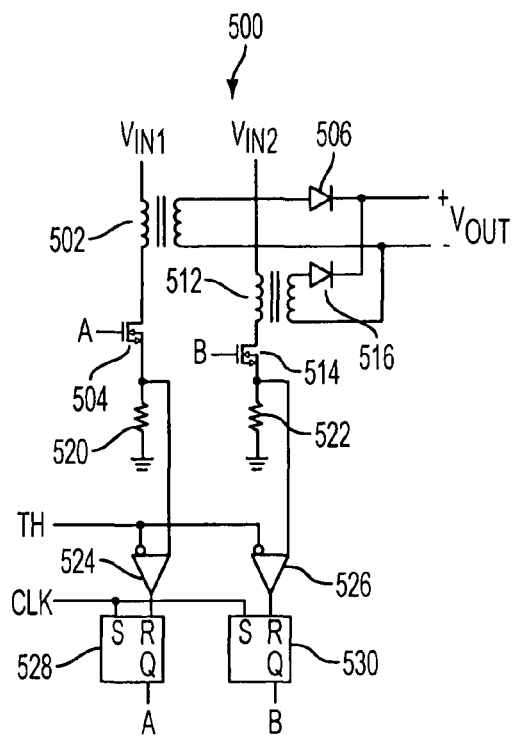
FIGS. 3A-3G are diagrams illustrating exemplary embodiments of the present disclosure that involve controlling switching regulators so as to limit current in the associated transformers or inductors in each switching cycle to a common peak current value or to a common average current value.

For example, FIG. 3A shows balancing circuitry 500 that limits current in the associated transformers to a common pick value for equalizing power to be drawn from two power supply inputs $V_{IN1}$ and $V_{IN2}$. The circuitry 500 includes two flyback switching regulators respectively connected to the inputs $V_{IN1}$ and $V_{IN2}$. Each of the switching regulators includes a transformer, a MOSFET switch coupled to the primary winding of the transformer and a diode connected to the secondary winding.

In particular, the switching regulator associated with the input $V_{IN1}$ includes a transformer 502, a MOSFET switch 504 and a diode 506; and the switching regulator associated with the input $V_{IN2}$ includes a transformer 512, a MOSFET switch 514 and a diode 516. Outputs of the switching regulators are tied together to form a single output voltage Vout.

Sense resistors 520 and 522 are respectively connected to the electrodes of the MOSFET transistors 504 and 514. Comparators 524 and 526 are respectively connected to the sense resistors 520 and 522 to compare voltages corresponding to the current values in the sense resistors 520 and 522 with a common preset threshold value TH established to limit current in the transformers 502 and 512.

The R-inputs of SR flip-flop circuits 528 and 530 are respectively connected to the outputs of the comparators 524 and 526. The S-inputs of these SR flip-flop circuits are supplied with a common clock signal CLK. Output signal A of the circuit 528 is supplied to the gate of the MOSFET switch 504 to control switching of the switching regulator associated with the input $V_{IN1}$, whereas output signal B of the circuit 530 is provided to the gate of the MOSFET switch 514 to control switching of the switching regulator associated with the input $V_{IN2}$.

Each of the switching regulators is configured to turn on at a predetermined time, and then to turn off when the current in the respective sense resistor reaches a preset limit defined by the threshold value, which is the same for both regulators. When each regulator reaches this current limit, the energy stored in its transformer will be $\frac{1}{2} LI^2$, where L is the inductance of the transformer, and I is a value of the current in the transformer. Hence, the energy stored in each transformer will be equal to a value independent of the input voltage. This energy is then transferred to the output during the time when the respective switch is off.

If one of the regulators is driven from a higher voltage, it will reach its preset limit sooner and operate at a lower duty cycle. As long as each regulator is running at the same clock frequency and the current limits are set to the same value, the energy consumed per switching cycle by each regulator will be the same, and integrated over time, equal power will be drawn from each input.

Figure 3B:
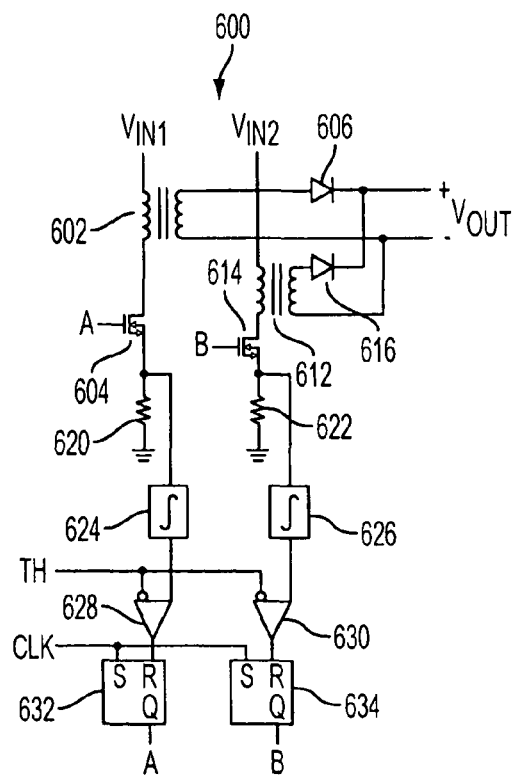

FIG. 3B shows balancing circuitry 600, which instead of responding to peak current values, responds to average current values integrated over complete switching cycles of the regulators. The circuitry 600 includes two flyback switching regulators respectively connected to the inputs $V_{IN1}$ and $V_{IN2}$. Each of the switching regulators includes a transformer, a MOSFET switch coupled to the primary winding of the transformer and a diode connected to the secondary winding.

In particular, the switching regulator associated with the input $V_{IN1}$ includes a transformer 602, a MOSFET switch 604 and a diode 606; and the switching regulator associated with the input $V_{IN2}$ includes a transformer 612, a MOSFET switch 614 and a diode 616. Outputs of the switching regulators are tied together to form a single output voltage Vout.

Sense resistors 620 and 622 are respectively connected to the electrodes of the MOSFET transistors 604 and 614. Integrating circuits 624 and 626 are respectfully connected to the sense resistors 620 and 622 to integrate the respective current readings over complete switching cycles of the respective regulators. Comparators 628 and 630 are respectively connected to the integrating circuits 624 and 626 to compare voltages corresponding to the average current values produced by the respective integrating circuits with a common preset threshold value TH established to limit current in the transformers 602 and 612.

The R-inputs of SR flip-flop circuits 632 and 634 are respectively connected to the outputs of the comparators 628 and 630. The S-inputs of the SR flip-flop circuits are supplied with a common clock signal CLK. The output signal A of the circuit 632 is supplied to the gate of the MOSFET switch 604 to control switching of the switching regulator associated with the input $V_{IN1}$, whereas the output signal B of the circuit 634 is provided to the gate of the MOSFET switch 614 to control switching of the switching regulator associated with the input $V_{IN2}$.

Each of the switching regulators is configured to turn on at a predetermined time, and then to turn off when the average current produced by the respective integrating circuit reaches a preset limit defined by the threshold value common for both regulators. Therefore, the current drawn over the complete switching cycle from each of the two inputs will be forced to be equal.

Figure 3C:
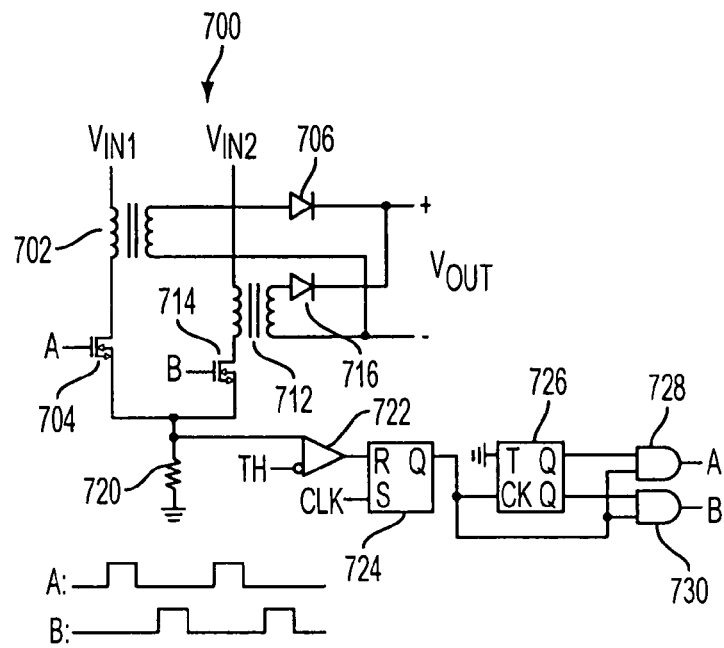

FIG. 3C shows two-input balancing circuitry 700 using a single sense resistor for both switching regulators, instead of a pair of sense resistors shown in FIG. 4A. The circuitry 700 includes two flyback switching regulators respectively connected to the inputs $V_{IN1}$ and $V_{IN2}$. Each of the switching regulators includes a transformer, a MOSFET switch coupled to the primary winding of the transformer and a diode connected to the secondary winding.

In particular, the switching regulator associated with the input $V_{IN1}$ includes a transformer 702, a MOSFET switch 704 and a diode 706; and the switching regulator associated with the input $V_{IN2}$ includes a transformer 712, a MOSFET switch 714 and a diode 716. Outputs of the switching regulators are tied together to form a single output voltage Vout.

A sense resistor 720 is connected to respective electrodes of the MOSFET transistors 704 and 714. A comparator 722 is connected to the sense resistor 720 to compare the voltage corresponding to the current in the sense resistor 720 with a preset threshold value TH established to limit current in the transformers 702 and 712. The R input of an SR flip-flop circuit 724 is connected to the output of the comparator 722, whereas the S input is supplied with a clock signal CLK.

The output signal of the SR flip-flop circuit 724 is supplied to a logic circuit that produces interleaving pulse signals A and B for controlling the MOSFET switches 704 and 714, respectively. In particular, the output of the SR flip-flop circuit 724 is connected to a clock input of a T flip-flop circuit 726 and to first inputs of AND gates 728 and 730. Second inputs of the AND gates 728 and 730 are respectively connected to non-inverting and inverting outputs of the T flip-flop circuit 726. As a result, the AND gates 728 and 730 produce interleaving control signals A and B for controlling the MOSFET switches 704 and 714, respectively.

Due to the interleaving control technique implemented by the circuitry 700, the switching regulators associated with inputs $V_{IN1}$ and $V_{IN2}$ are switched in turn. Therefore, only one of the switching regulators is active at any given time period. A similar interleaving control technique may be used to control switching regulators in FIGS. 3A-3C and 4A.

Figure 3D:
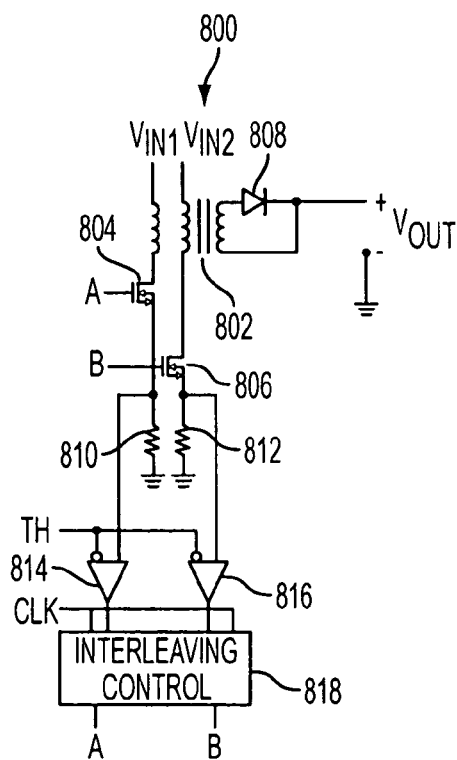

FIG. 3D shows two-input balancing circuitry 800 using two switching regulators having a common transformer 802 with two primary windings. The first primary winding is connected to the input $V_{IN1}$, whereas the second primary winding is coupled to the input $V_{IN2}$. MOSFET switches 804 and 806 are respectively coupled to the first and second primary windings. A diode 808 is connected to the secondary winding of the transformer 802.

Sense resistors 810 and 812 are respectively connected to the MOSFET switches 804 and 806. Comparators 814 and 816 are respectively coupled to the sense resistors 810 and 812 to compare voltages corresponding to the current values in the sense resistors 810 and 812 with a common preset threshold value TH established to limit current in the transformer 802. The output signals of the comparators 814 and 816, together with a common clock signal CLK, are supplied to interleaving control circuitry 818 to produce interleaving control signals A and B for controlling the MOSFET switches 804 and 806, respectively. The interleaving control circuitry 818 may be configured similarly to the control circuit in FIG. 3C to provide switching of the regulators in turn so that only one switching regulator is active at any given time period.

Figure 3E:
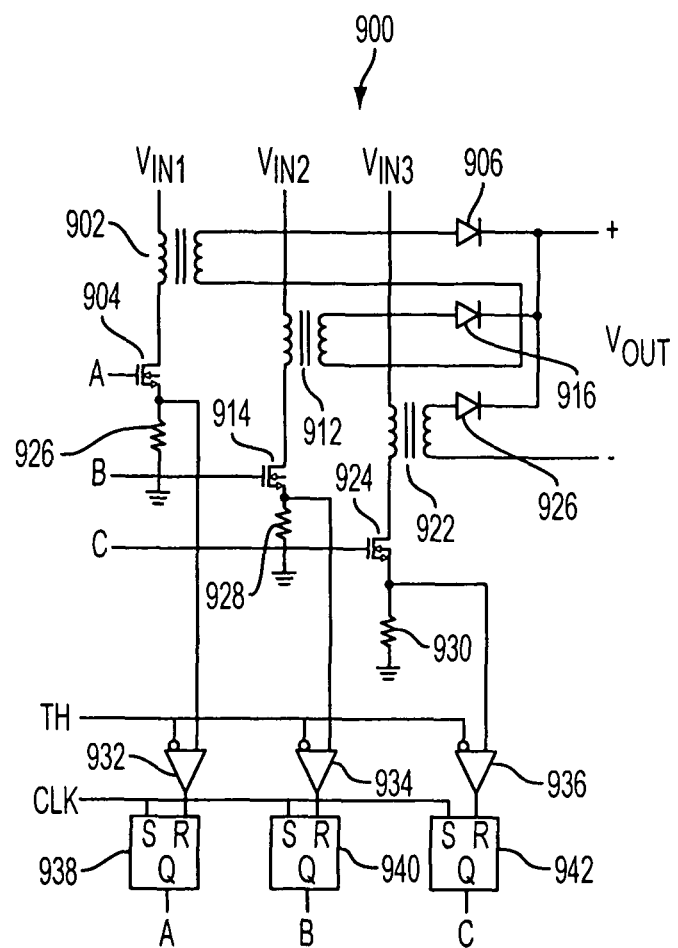

FIG. 3E shows an exemplary balancing circuitry 900 of the present disclosure for supporting more than two power supply inputs. For example, the circuitry 900 may include three flyback switching regulators respectively connected to power supply inputs $V_{IN1}$, $V_{IN2}$ and $V_{IN3}$. Each of the switching regulators includes a transformer, a MOSFET switch coupled to the primary winding of the transformer and a diode connected to the secondary winding. Although the multiple-input balancing technique is presented with the example of three power supply inputs, one skilled in the art will realize that any number of individual power supplies may be supported in accordance with the present disclosure. For example, each of the multiple power supply inputs may be coupled to a respective switching regulator controlled in a prescribed manner.

In accordance with an exemplary embodiment shown in FIG. 3E, the switching regulator associated with the input $V_{IN1}$ includes a transformer 902, a MOSFET switch 904 and a diode 906; the switching regulator associated with the input $V_{IN2}$ includes a transformer 912, a MOSFET switch 914 and a diode 916; and the switching regulator associated with the input $V_{IN3}$ includes a transformer 922, a MOSFET switch 924 and a diode 926. Outputs of the switching regulators are tied together to form a single output voltage Vout.

Sense resistors 926, 928 and 930 are respectively connected to the electrodes of the MOSFET transistors 904, 914 and 9244. Comparators 932, 934 and 936 are respectively connected to the sense resistors 926, 928 and 930 to compare voltages corresponding to the current values in the respective sense resistors with a common preset threshold value TH established to limit current in the transformers 902, 912 and 922.

The R-inputs of SR flip-flop circuits 938, 940 and 942 are respectively connected to the outputs of the comparators 932, 934 and 936. The S-inputs of the SR flip-flop circuits are supplied with a common clock signal CLK. The output signal A of the circuit 938 is supplied to the gate of the MOSFET switch 904 to control switching of the switching regulator associated with the input $V_{IN1}$, the output signal B of the circuit 940 is provided to the gate of the MOSFET switch 914 to control switching of the switching regulator associated with the input $V_{IN2}$, and the output signal C of the circuit 942 is supplied to the gate of the MOSFET switch 924 to control switching of the switching regulator associated with the input $V_{IN3}$.

Similarly to the circuitry in FIG. 3A, the switching regulators in the circuitry 900 are controlled to limit the current in their associated transformers in each switching cycle to a common peak current value. However, one skilled in the art would realize that the multiple-input balancing circuitry of the present disclosure may operate similarly to the circuitry in FIG. 3B using a technique for limiting current in the transformers of the regulators in each switching cycle to a common average current value.

Figure 3F:
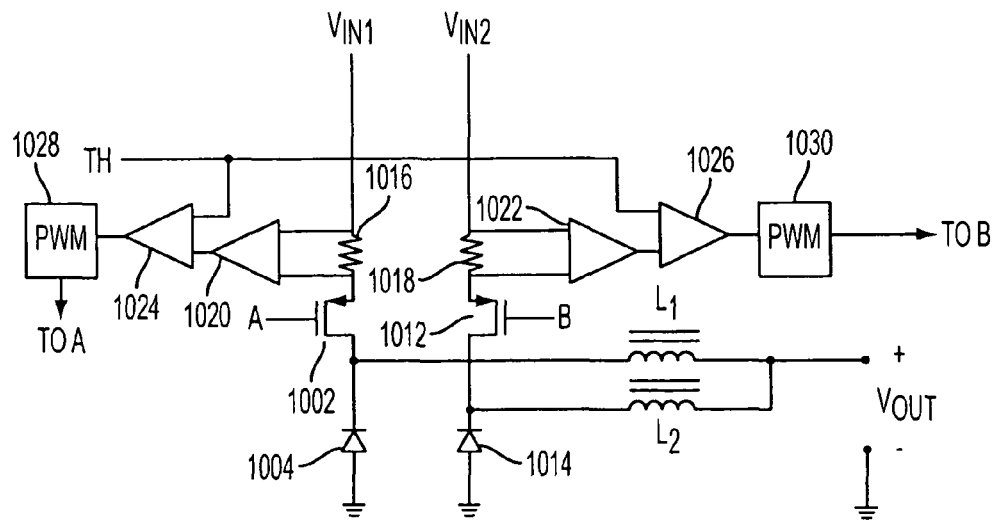
Figure 3G:
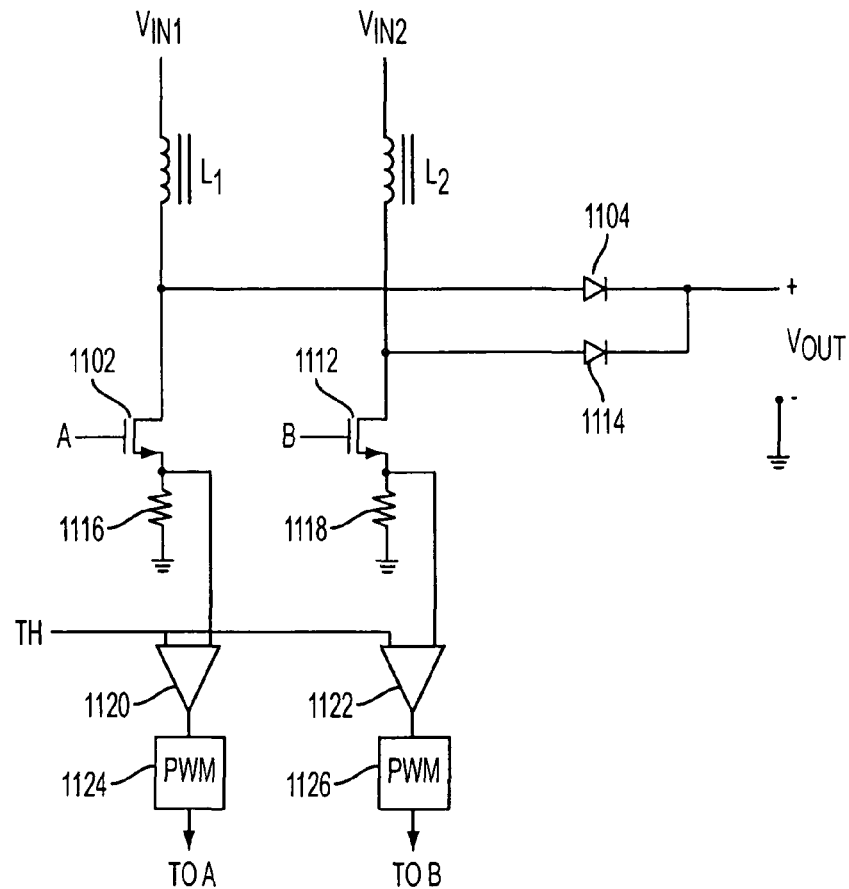

FIGS. 3F and 3G illustrate examples of balancing technique, in which switching regulators include inductors instead of transformers. In particular, FIG. 3F shows balancing circuitry 1000 that balances power drawn from power supply inputs $V_{IN1}$ and $V_{IN2}$ by controlling respective switching regulators operating in a buck mode. The switching regulator associated with the input $V_{IN1}$ includes an inductor $L_1$, a MOSFET switch 1002 and a diode 1004; and the switching regulator associated with the input $V_{IN2}$ includes an inductor $L_2$, a MOSFET switch 1012 and a diode 1014. The MOSFETs 1002 and 1012 are arranged between the power supply inputs $V_{IN1}$ and $V_{IN2}$ and the inductors $L_1$ and $L_2$, respectively. The inductors $L_1$ and $L_2$ are coupled to each other to form a single output voltage Vout.

Sense resistors 1016 and 1018 are respectively connected between the power supply inputs $V_{IN1}$ and $V_{IN2}$ and electrodes of the MOSFETs 1002 and 1004. Differential-to-single-ended converters 1020 and 1022 are respectively coupled across the sense resistors 1016 and 1018 to convert differential signals produced across the resistors 1016 and 1018 into single-ended signals. Comparators 1024 and 1026 compare the respective single-ended signals with a common threshold value TH established to limit current in the inductors $L_1$ and $L_2$.

The output of the comparator 1024 feeds a pulse-width modulation (PWM) circuit 1028 that produces a PWM signal for driving the gate of the MOSFET 1002 to control switching of the switching regulator associated with the input $V_{IN1}$. The output signal of the comparator 1026 is supplied to a PWM circuit 1030 that produces a PWM signal for driving the gate of the MOSFET 1004 to control switching of the switching regulator associated with the input $V_{IN2}$.

Hence, both switching regulators are controlled so as to limit the current in the inductors $L_1$ and $L_2$ to a common pick value defined by the threshold value TH. When each switching regulator reaches this current limit, the energy stored in its inductor will be ½ $LI^2$, where L is the inductance of the inductor, and I is a value of the current in the inductor. Hence, the energy stored in each inductor will be equal to a value independent of the input voltage. This energy is then transferred to the output during the time when the respective switch is off.

If one of the switching regulators is driven from a higher voltage, it will reaches its preset limit sooner and operate at a lower duty cycle. As the energy consumed per switching cycle by each regulator will be the same, and integrated over time, equal power will be drawn from each input.

As one skilled in the art would realize, the balancing circuit 1000 may be modified to provide an equal current draw from each of the power supply inputs by integrating a signal produced across each of the sense resistors over the complete cycle of the regulators to define average current in each of the inductors $L_1$ and $L_2$. The average current may be limited to a common value in a manner similar to the technique disclosed in connection with FIG. 3B.

FIG. 3G shows a balancing circuit 1100, in which switching regulators operating in a boost mode are controlled to equalize power drawn from power supply inputs $V_{IN1}$ and $V_{IN2}$. The switching regulator associated with the input $V_{IN1}$ includes an inductor $L_1$, a MOSFET switch 1102 and a diode 1104; and the switching regulator associated with the input $V_{IN2}$ includes an inductor $L_2$, a MOSFET switch 1112 and a diode 1114. The inductors $L_1$ and $L_2$ are arranged between the power supply inputs $V_{IN1}$ and $V_{IN2}$ and the MOSFETs 1102 and 1112, respectively. The diodes 1104 and 1114 respectively connected to the inductors $L_1$ and $L_2$ are coupled to each other to form a single output voltage Vout.

Sense resistors 1116 and 1118 are respectively connected to the electrodes of the MOSFET transistors 1102 and 1112. Comparators 1120 and 1122 are connected to the sense resistors 1116 and 1118, respectively, to compare voltages corresponding to the current values in the respective sense resistors with a common preset threshold value TH established to limit current in the inductors $L_1$ and $L_2$.

The output signals of comparators 1120 and 1122 respectively feed PWM circuits 1124 and 1126 that produce PWM signals for driving the gates of the MOSFETs 1102 and 1112, respectively. Hence, both switching regulators are controlled to limit the current in the respective inductors $L_1$ and $L_2$ to a level defined by the common threshold value TH. As a result, power drawn from each power supply input will be equal. One skilled in the art would realize that the balancing circuit 1100 may be modified to provide an equal current draw from each power supply input by limiting the average current in the inductors $L_1$ and $L_2$ integrated over the complete cycle of the regulators, to a common value in a manner similar to the technique disclosed in connection with FIG. 3B.

Although FIGS. 3A-3G show the balancing circuits having a single output, one skilled in the art would realize that multiple outputs may be provided in accordance with the present disclosure. For example, multiple outputs may be generated by providing multiple secondary windings in the transformer of each flyback switching regulator in FIGS. 4A-4E. The arrangements of flyback switching regulators with multiple outputs are well known to those skilled in the art of switching regulators.

The foregoing description illustrates and describes aspects of the present invention. Additionally, the disclosure shows and describes only preferred embodiments, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art.

The embodiments described hereinabove are further intended to explain best modes known of practicing the invention and to enable others skilled in the art to utilize the invention in such, or other, embodiments and with the various modifications required by the particular applications or uses of the invention.

Accordingly, the description is not intended to limit the invention to the form disclosed herein. Also, it is intended that the appended claims be construed to include alternative embodiments.

What is claimed is:
1. A flyback converter power supply circuit having an output comprising:
   multiple power supply inputs for respectively receiving multiple voltages from multiple voltage sources;
   multiple switching circuits that each include a switching regulator having a flyback configuration coupled to the respective power supply inputs to respectively receive the multiple voltages including at least two voltages having different values;

at least one primary inductive winding coupled to each of the switching circuits;

at least one secondary winding coupled to each of the primary windings and to the output;

a clock circuit that creates a switching cycle; and control circuitry that controls the switching circuits by:
receiving a signal present in the current path of the at least one primary inductive winding that is representative of the instantaneous current in the at least one primary inductive winding;

comparing the signal with a single threshold value common to all of the switching circuits, the single threshold value being based on the voltage at the output of the power supply circuit; and shortening a pulse width of a switching cycle when the signal exceeds the threshold so as to limit the instantaneous peak current in said at least one primary inductive winding in each switching cycle to a peak current value common to all of the switching circuits to balance power drawn from the multiple power supply inputs.

2. The circuit of claim 1, wherein each primary inductive winding is part of a transformer.

3. The circuit of claim 2, wherein a separate transformer is associated with each of the switching circuits.

4. The circuit of claim 2, wherein the switching circuits share a common transformer.

5. The circuit of claim 1, wherein the control circuitry further includes logic circuitry responsive to an output of the comparator circuitry and controlled by a clock signal common to all of the switching circuits for producing multiple control signals for controlling the respective switching circuits.

6. The circuit of claim 5, wherein the comparator circuitry includes multiple comparators corresponding to the respective switching circuits, and the logic circuitry includes multiple logic circuits responsive to the respective comparators for controlling switching of the respective switching circuits.

7. The circuit of claim 5, wherein the comparator circuitry includes a single comparator for comparing a current value common to all of the switching circuits with the threshold value, and a logic circuit responsive to an output of the comparator for producing multiple control signals for controlling switching of the respective switching circuits.

8. The circuit of claim 5, wherein the control circuitry further includes an integrator responsive to current in each of the switching circuits for providing the comparator circuitry with a current value integrated over a switching cycle.

9. The circuit of claim 5, wherein the logic circuitry is configured for producing interleaving control signals so as to turn on only one of the switching circuits at a time.

10. The circuit of claim 1, wherein the control circuitry includes differential-to-single-ended converters for converting differential signals sensed at the power supply inputs to single-ended signals.

11. The circuit of claim 10, wherein the control circuitry further includes comparators for comparing the single-ended signals with a common threshold value selected to limit current in said at least one primary inductive winding.

12. The circuit of claim 11, wherein the control circuitry further includes pulse-width-modulation circuits responsive to outputs of the comparators for controlling switching of the switching circuits.

13. The circuit of claim 1, wherein the switching regulator has a boost configuration.

14. The circuit of claim 13, wherein the control circuitry includes comparators for comparing signals sensed at the power supply inputs with a common threshold value selected to limit current in said at least one primary inductive winding.

15. The circuit of claim 14, wherein the control circuitry further includes pulse-width-modulation circuits responsive to outputs of the comparators for controlling switching of the switching circuits.

16. A method of balancing multiple voltages supplied by multiple power supply inputs from multiple voltage sources, comprising the steps of:
converting the multiple voltages including at least two voltages having different values and supplied from the power supply inputs, using respective switching circuits coupled for receiving the multiple voltages that each include a switching regulator having a flyback configuration, at least one primary inductive winding coupled to each of the switching circuits, and at least one secondary winding coupled to each of the primary windings and to an output of the switching regulator, determining in each switching cycle of the switching circuit that is created by a clock circuit a value of instantaneous peak current through the primary inductive winding in the switching circuit, receiving a signal present in the current path of the at least one primary inductive winding that is representative of the instantaneous current in the at least one primary inductive winding;

comparing the signal with a single threshold value common to all of the switching circuits, the single threshold value being based on the voltage of the output of the power supply circuit; and shortening a pulse width of a switching cycle when the signal exceeds the threshold so as to limit the instantaneous peak current in said at least one primary inductive winding in each switching cycle to a peak current value common to all of the switching circuits to balance power drawn from the multiple power supply inputs.

17. The method of claim 16, wherein each of the switching circuits is turned off when a respective signal value reaches the preset threshold value.

* * * * *